(Model.)
J. BACHNER.
STEM WINDING AND SETTING WATCH.
No. 354,083. Patented Dec. 14, 1886.
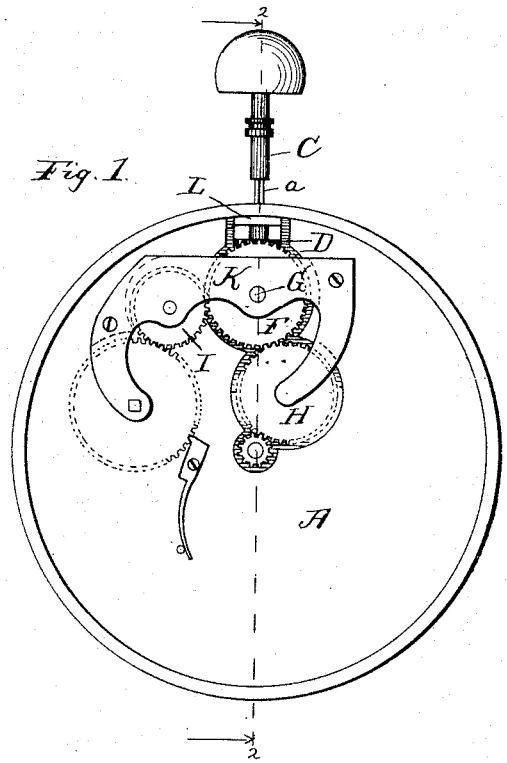
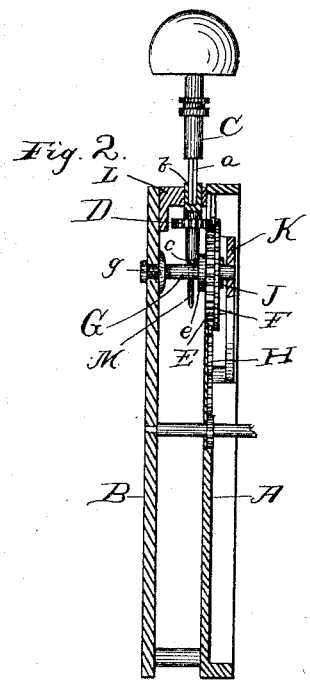
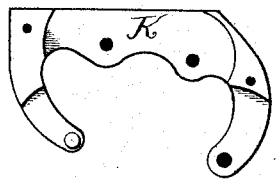
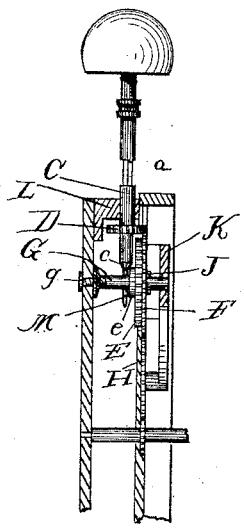
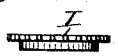
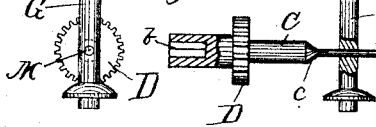
Witnesses:
Geo. E. Curtis
A. M. Munday
Inventor:
Joseph Bachner
By Munday Evarts & Adcock
his Attorneys

UNITED STATES PATENT OFFICE.

JOSEPH BACHNER, OF CHICAGO, ILLINOIS, ASSIGNOR TO HIMSELF AND GEORGE A. HARMOUNT, OF SAME PLACE.

STEM WINDING AND SETTING WATCH.

SPECIFICATION forming part of Letters Patent No. 354,083, dated December 14, 1886.

Application filed April 16, 1886. Serial No. 199,050. (Model.)

*To all whom it may concern:*

Be it known that I, JOSEPH BACHNER, a citizen of the Republic of France, residing in Chicago, in the county of Cook and State of Illinois, have invented a new and useful Improvement in Stem Winding and Setting Mechanisms, of which the following is a specification.

This invention relates to the winding and setting mechanism of stem-winding watches and clocks, and its chief object is to simplify the mechanism heretofore employed for this purpose. In the former applications filed by me (Nos. 184,407 and 192,748) I have shown winding and setting mechanisms employing longitudinally-movable stems, in combination with gears connecting with the winding and setting trains, one or both said gears being laterally movable to allow the stem to be moved inward. In both cases the shifting of the gear or gears was accomplished by a separate cam bearing against the gear-pivot and actuated by the contact therewith of the stem in its inward movement.

In my present invention I dispense entirely with the separate cam by devolving the shifting function upon the stem, giving it, for that purpose, a cone-shaped formation at its inner end, which acts directly upon the gears and shifts them whenever the stem is moved toward the center of the watch. I also mount the shifting-gear upon a stationary arbor, and provide the sliding stem with an inner bearing, preferably, in such arbor, whereby the stem is enabled to exert the lateral force necessary in shifting the gears without injury to itself. These and other features of my invention are fully disclosed in the subjoined description and the accompanying drawings, in the latter of which—

Figure 1 is an elevation of a watch-movement, showing the side thereof carrying the gears through which the hands and winding-shaft are actuated from the stem. Fig. 2 is a cross-section thereof on the line 2 2 of Fig. 1, showing the stem in its inner position. Fig. 3 is a section similar to Fig. 2, showing the stem in its outer position. Fig. 4 shows the inner face of the bridge for confining the shifting and other gears. Figs. 5, 6, and 7 are peripheral views of the shifting-gears and the initial gears of the winding and setting trains. Fig. 8 is a detached view of the stem. Fig. 9 shows the spring for shifting the gears inward when the stem is pulled outward, and Fig. 10 shows the manner of centering or staying the inner end of the stem. Fig. 11 is a partial section upon a line drawn through the axes of wheels H and I.

In said drawings, A represents the pillar-plate, and B the back plate, of a time-movement.

C is the usual rotatable stem by which the movement is wound and set. The inner and outer parts of the stem may be joined in any of the customary ways—as, for instance, by the angular point $a$ and recess $b$. The stem carries the usual stem-wheel, D, and is longitudinally movable, so that said wheel is caused to mesh in one position with the winding-train and in the other with the setting-train.

E F are the shifting gears or wheels. They are concentric, one being larger than the other, are rigidly secured together, and are loosely mounted upon an arbor, G, which, for a purpose hereinafter explained, may be stationary, and is preferably secured by a screw, $g$, to the back plate. These wheels have an inner hub, $e$, against which the cone-shaped end $c$ of the stem contacts when the stem is moved in, resulting in shifting the gears laterally away from the stem from the position given by Fig. 3 to that in Fig. 2. In the former of these positions the stem-wheel meshes with the larger of the two wheels, and through it gives motion to the wheel H, leading to the hand-shaft. In the other position the stem-wheel meshes with the smaller of the gears, while the larger one in its changed position engages with the wheel I, carrying motion to the winding-shaft.

The wheels H and I are located in different planes, as shown by Fig. 11. When the stem is retracted or drawn out, the spring J pushes the shifting gears to their inner position, Fig. 3. This spring is confined, with arbor G passing through its central perforation between the gears and the bridge K, which also acts to retain the several other gears in position, as shown.

The stem has a bearing in the bridge L, as usual; but to enable it to exert the necessary lateral force in shifting the gears without injury, I provide it with an inner bearing also. This may be done in a very simple way, by making the arbor G stationary and passing the attenuated elongation M of the stem through an opening in the arbor, as plainly illustrated.

I claim—

1. The longitudinally-movable stem having cone $c$ and the stem-wheel, in combination with shiftable wheels conveying motion from the stem to the winding and setting trains, and acted upon directly by said cone, substantially as specified.

2. The longitudinally-movable stem having a cone $c$, and the stem-wheel, in combination with the shifting wheels for conveying motion from the stem to the winding and setting trains, and the spring J, substantially as specified.

3. The combination of the longitudinally-movable stem having the conical end with the laterally-shifting wheels E F, having the collar $e$, and the arbor upon which said wheels are loosely mounted, substantially as specified.

4. The longitudinally-movable stem having a conical portion, $c$, and provided with both inner and outer bearings, in combination with the laterally-movable wheels shifted by lateral force exerted by said conical portion $c$, substantially as specified.

5. The longitudinally-movable stem having a conical portion, $c$, and an elongation, M, in combination with the stationary arbor G, through which said elongation passes, and the shiftable wheels borne by said arbor, substantially as specified.

JOSEPH BACHNER.

Witnesses:
H. M. MUNDAY,
JOHN W. MUNDAY.